(12) United States Patent
Ramesh et al.

(10) Patent No.: US 11,983,806 B1
(45) Date of Patent: May 14, 2024

(54) SYSTEMS AND METHODS FOR IMAGE GENERATION WITH MACHINE LEARNING MODELS

(71) Applicant: c/o OpenAI Opco, LLC, San Francisco, CA (US)

(72) Inventors: Aditya Ramesh, San Francisco, CA (US); Alexander Nichol, San Francisco, CA (US); Prafulla Dhariwal, San Francisco, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/458,907

(22) Filed: Aug. 30, 2023

(51) Int. Cl.
*G06K 9/36* (2006.01)
*G06T 5/00* (2006.01)
*G06T 11/60* (2006.01)
*G06V 10/77* (2022.01)

(52) U.S. Cl.
CPC .............. *G06T 11/60* (2013.01); *G06T 5/00* (2013.01); *G06V 10/77* (2022.01); *G06T 2207/20104* (2013.01); *G06T 2207/20221* (2013.01)

(58) Field of Classification Search
CPC . G06T 11/60; G06T 5/00; G06T 2207/20104; G06T 2207/20221; G06T 7/11; G06T 7/187; G06T 7/70; G06T 7/73; G06T 7/75; G06T 7/77; G06T 11/00; G06T 2207/10004; G06T 2207/20084; G06T 2207/20081; G06T 2207/30196; G06V 10/77; G06V 30/413; G06V 30/1444; G06V 10/82; G06V 30/19147; G06V 10/774; G06F 18/214; G06N 3/08; G06N 3/047; G06N 3/045
See application file for complete search history.

(56) References Cited

U.S. PATENT DOCUMENTS

| 11,250,547 | B2 | 2/2022 | Lin et al. |
| 2019/0114748 | A1 | 4/2019 | Lin et al. |
| 2020/0402243 | A1* | 12/2020 | Benou ............... G06V 20/46 |
| 2021/0183022 | A1* | 6/2021 | Wang ................ G06V 10/82 |
| 2022/0108509 | A1 | 4/2022 | Swaminathan et al. |
| 2022/0301118 | A1 | 9/2022 | Frey et al. |
| 2023/0177821 | A1 | 6/2023 | Peng et al. |

FOREIGN PATENT DOCUMENTS

| CN | 114514560 A | 5/2022 |
| CN | 114943789 A | 8/2022 |

\* cited by examiner

*Primary Examiner* — Duy M Dang
(74) *Attorney, Agent, or Firm* — Finnegan, Henderson, Farabow Garrett & Dunner LLP

(57) ABSTRACT

Disclosed herein are methods, systems, and computer-readable media for regenerating a region of an image with a machine learning model based on a text input. Disclosed embodiments involve accessing a digital input image. Disclosed embodiments involve generating a masked image by removing a masked region from the input image. Disclosed embodiments involve accessing a text input corresponding to an image enhancement prompt. Disclosed embodiments include providing at least one of the input image, the masked region, or the text input to a machine learning model configured to generate an enhanced image. Disclosed embodiments involve generating, with the machine learning model, the enhanced image based on at least one of the input image, the masked region, or the text input.

20 Claims, 12 Drawing Sheets

SYSTEMS AND METHODS FOR IMAGE GENERATION WITH MACHINE LEARNING MODELS

FIELD OF DISCLOSURE

The disclosed embodiments generally relate to systems, devices, methods, and computer readable media for generating images based on text inputs. Disclosed embodiments may relate to machine learning models configured to generate (or re-generate) enhanced images, including images with edited features inside and outside of the borders of an original image.

BACKGROUND

Generating images using Artificial Intelligence (AI) or machine learning (ML) is a challenging task that requires overcoming several obstacles. One of the main challenges is developing algorithms that can accurately capture the nuances of realistic, real-world images. This requires a deep understanding of factors such as lighting, texture, and perspective, which can be difficult to simulate with a computer program. Additionally, generating images that are truly realistic requires a tremendous amount of computational power and memory, which can be a limiting factor for many applications.

Image generation can also involve techniques for editing images to include altered or additional content. For example, expanding an image, such as to make an image larger than its original borders, is a technically complex problem because to computers maintaining overall meanings, semantics, and styles of an original image can be computationally difficult and/or expensive. Traditional or conventional image regeneration and editing systems may lack in the ability to change an image's aspect ratio while maintaining these important image features.

Moreover, generating images and image adjustments to a desired design can also be a technically difficult task. For example, conventional systems may not be able to generate images in a variety of styles while maintaining photorealism and efficiency.

The disclosed systems, apparatuses, devices, and methods are directed to overcoming these and other drawbacks of existing systems and for improved systems and methods for image generation with machine learning and/or AI models.

SUMMARY

Embodiments of the present disclosure present technological improvements as solutions to one or more of the above-mentioned technical problems recognized by the inventors in conventional systems. For example, in an embodiment, a non-transitory computer-readable medium may include instructions that are executable by one or more processors to perform operations for regeneration a region of an image with a machine learning model based on a text input. In some embodiments, the operations may include accessing a digital input image.

Some disclosed embodiments may include generating a masked image by removing a masked region from the input image, wherein the removing comprises masking pixel values corresponding to the masked region. Some disclosed embodiments include accessing a text input corresponding to an image enhancement prompt. Some disclosed embodiments include providing at least one of the input image, the masked region, or the text input to a machine learning model configured to generate an enhanced image, wherein the machine learning model includes a text-to-image model trained on a set of images.

Some disclosed embodiments include generating, with the machine learning model, the enhanced image based on at least one of the input image, the masked region, or the text input. In some embodiments, the generation includes replicating pixel values from the input image or the masked image to the enhanced image generating, with the machine learning model, an image segment based on the text input and pixel values from the masked image, and inserting the image segment into the enhanced image by replacing the masked region.

According to some disclosed embodiments, providing at least one of the input image, the masked region, or the text input to a machine learning model includes providing at least two of the input image, the masked region, or the text input to the machine learning model. According to some disclosed embodiments, the providing includes providing the input image, the masked region, and the text input to the machine learning model. Some disclosed embodiments include transmitting instructions to a client device for generating a graphical user interface and receiving, via the graphical user interface, the text input. In some embodiments, the masked region may be determined on the graphical user interface. Some disclosed embodiments may include generating an image file with the enhanced image.

In some embodiments, a user provides, via the graphical user interface, at least one of the determined masked region or the text input.

Some disclosed embodiments may involve training the machine learning model by determining one or more masked regions for at least one image in the set of images. In some embodiments, the machine learning model includes a deep learning model alongside a large language model.

Some disclosed embodiments include a first sub-model configured to generate an image embedding based on at least one of the text input, the masked image, and the masked region. Some disclosed embodiments include a second sub-model configured to generate the enhanced image based on at least one of the image embedding, the text input, the masked image, and the masked region.

In an embodiment, a non-transitory computer-readable medium may include instructions that are executable by one or more processors to perform operations for enhancing an image with a machine learning model based on a text input. The operations may include accessing a digital input image. In some embodiments, the input digital image includes a plurality of pixel values and at least one input image dimension.

Some disclosed embodiments include generating an extended image by overlapping a masked region on the input region. In some embodiments, the overlapping includes masking pixel values corresponding to the masked region. Some disclosed embodiments involve receiving an image enhancement prompt, the image enhancement prompt describing an addition to the input image. Some disclosed embodiments include providing the input image, the masked region, and the enhancement prompt to a machine learning model configured to generate an enhanced image having at least one enhanced dimension, wherein the machine learning model includes a text-to-image model trained on a set of images and the enhanced dimension is larger than the at least one input image dimension. Some disclosed embodiments involve generating, with the machine learning model, the enhanced image based on the input image, the masked region, and the enhancement prompt. In some embodiments, the generation includes replicating pixel values from the input image to the enhanced image. Some disclosed embodiments include generating, with the machine learning model, an image extension segment based on the enhancement prompt and pixel values from the masked region. Some disclosed embodiments involve inserting the image extension segment into the enhanced image by replacing the masked region with the image extension segment, wherein the inserting extends a dimension in the enhanced dimension beyond a dimension in the at least one input image dimension Some disclosed embodiments may be directed to systems for enhancing an image with a machine learning model. The system may include one or more processors and one or more memory devices. The one or more processors may be configured to preform operations including accessing a digital input image, the input image having: a plurality of pixel values; and at least one input image dimension. The operations may also include generating an extended image by overlapping a masked overlap region on the input image (wherein the overlapping comprises masking pixel values corresponding to the masked overlap region) and receiving an image enhancement prompt, the image enhancement prompt describing an addition to the input image. The operations may also include providing the input image, the masked overlap region, and the enhancement prompt to a machine learning model configured to generate an enhanced image having at least one enhanced dimension, where the machine learning may include a text-to-image model trained on a set of images and the enhanced dimension is larger than the at least one input image dimension. The operations may also include generating, with the machine learning model, the enhanced image based on the input image, the masked overlap region, and the enhancement prompt. In some embodiments, the generation may include: replicating pixel values from the input image to the enhanced image; generating, with the machine learning model, an image extension segment based on the enhancement prompt and pixel values from the masked overlap region; and inserting the image extension segment into the enhanced image by replacing the masked overlap region with the image extension segment, wherein the inserting extends a dimension in the enhanced dimension beyond a dimension in the at least one input image dimension.

Some disclosed embodiments may involve transmitting instructions to a client device for generating a graphical user interface and receiving, via the graphical user interface, the image enhancement prompt, wherein the image enhancement prompt comprises a text input.

In some disclosed embodiments, the masked region may be determined on the graphical user interface. In some disclosed embodiments, generating the enhanced image involves generating an image file with the enhanced image, and transmitting the image file via the graphical user interface. In some disclosed embodiments, a user provides, via the graphical user interface, at least one of the determined masked region or the image enhancement prompt.

In some disclosed embodiments, the inserting extends a vertical dimension or a horizontal dimension in the enhanced dimension beyond a vertical dimension or a horizontal dimension in the at least one input image dimension. In some disclosed embodiments, the inserting extends a vertical dimension and a horizontal dimension in the enhanced dimension beyond a vertical dimension and a horizontal dimension in the at least one input image dimension.

Some disclosed embodiments involve training the machine learning model by determining one or more masked regions for at least one image in the set of images. In some disclosed embodiments, the machine learning model comprises a deep learning model alongside a large language model. In some disclosed embodiments, the machine learning model further comprises a first sub-model configured to generate an image embedding based on at least one of the image enhancement prompt, the masked image, and the masked region, and a second sub-model configured to generate the enhanced image based on at least one of the image embedding, the image enhancement prompt, the masked image, and the masked region.

Some disclosed embodiments may be directed to a server deploying a machine learning model that is configured to generate AI-based images. The server may include networking devices and configured for communication with client devices. The server may be configured to perform operations including accessing a digital input image, the input image having: a plurality of pixel values; and at least one input image dimension. The operations may also include generating an extended image by overlapping a masked overlap region on the input image (wherein the overlapping comprises masking pixel values corresponding to the masked overlap region) and receiving an image enhancement prompt, the image enhancement prompt describing an addition to the input image. The operations may also include providing the input image, the masked overlap region, and the enhancement prompt to a machine learning model configured to generate an enhanced image having at least one enhanced dimension, where the machine learning may include a text-to-image model trained on a set of images and the enhanced dimension is larger than the at least one input image dimension. The operations may also include generating, with the machine learning model, the enhanced image based on the input image, the masked overlap region, and the enhancement prompt. In some embodiments, the generation may include: replicating pixel values from the input image to the enhanced image; generating, with the machine learning model, an image extension segment based on the enhancement prompt and pixel values from the masked overlap region; and inserting the image extension segment into the enhanced image by replacing the masked overlap region with the image extension segment, wherein the inserting extends a dimension in the enhanced dimension beyond a dimension in the at least one input image dimension.

Other systems, methods, and computer-readable media are also discussed within. The foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
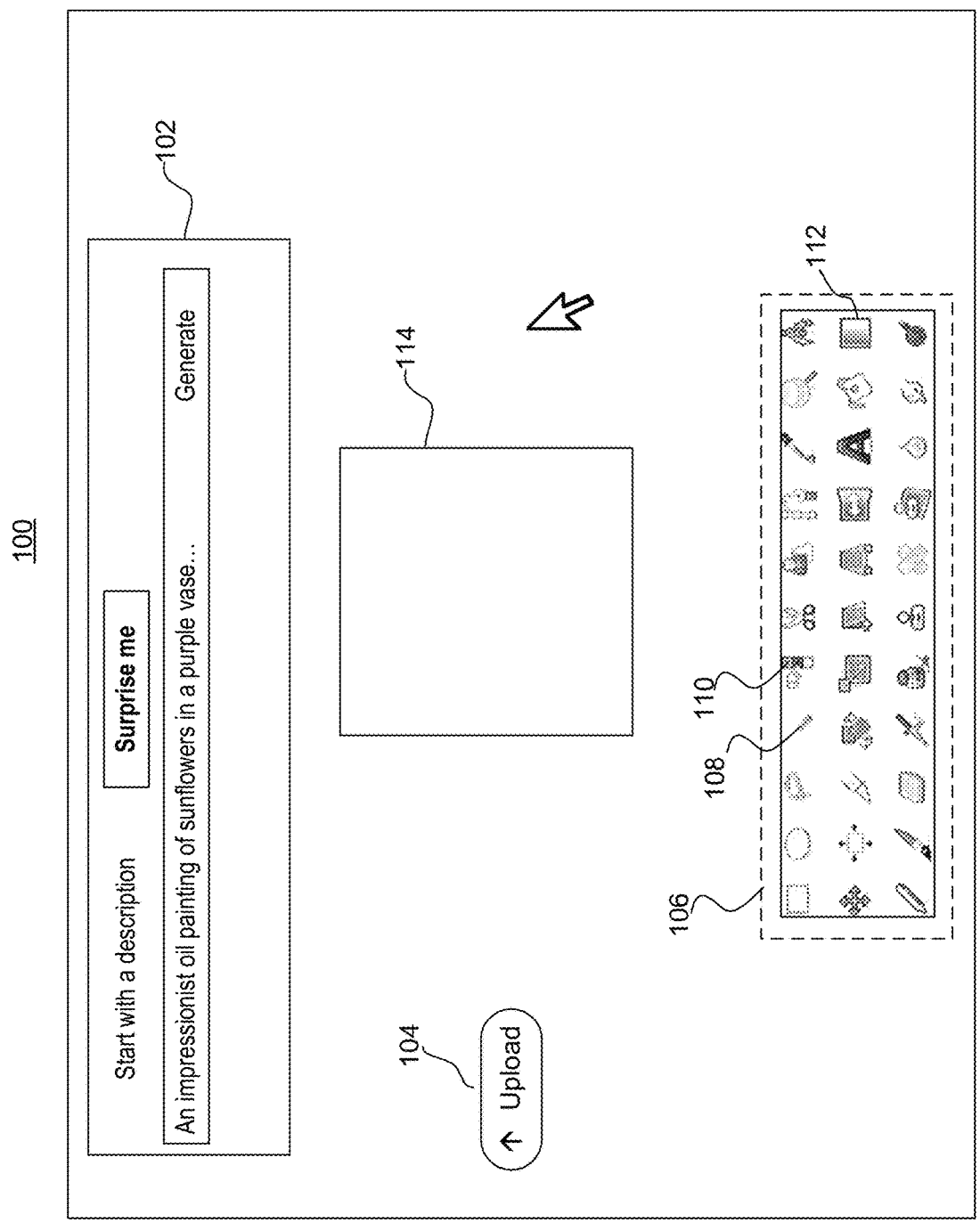
FIG. 1 is an illustration of an exemplary user interface dashboard, consistent with embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Disclosed embodiments may involve improvements to the fields of deep learning, computer vision, and natural language processing, including improvements in teaching a machine to generate a digital image from a text description and in using trained models to generate or edit digital images based on limited input. Given an input image, disclosed embodiments may include models which can generate an edited version of the image. For example, given an input image, disclosed embodiments may use a machine learning model to edit the image consistent with a text prompt.

Disclosed embodiments may improve the technical field of AI-based image generation and editing, including achieving images that are high-resolution, new compositions, and/or photorealistic. Generated images may maintain the semantics, context, meaning, and style of an original image while editing one or more portions of the image. Disclosed embodiments may also enable generation of an image beyond the image's original borders, thereby providing larger images which can capture more details. Disclosed embodiments may provide the capability for a user to guide the model, such as allowing the user to give input to the model and thereby exert more control over the AI-based generated images, resulting in an image that more closely resembles the image desired by the user.

As a non-limiting example, disclosed embodiments may provide practical applications by improving the mechanisms and interfaces to generate or edits images with machine learning models. Applications may include editing images for professional or recreational purposes, as well as generating images for artistic purposes. Disclosed embodiments, thus, may enable creation of artistic images using machine learning models that may be too difficult or time consuming to generate with other methods. Further, the disclosed embodiments may be applicable to the generation of images that may be used for training of machine learning models. For example, disclosed embodiments may be used to generate images in mass that may be part of training data sets for machine learning models.

Disclosed embodiments are also directed to solving technical problems in the training of an AI-based image generation model such as a deep neural network. Training machine learning models for the generation of images is cumbersome as it requires very large data sets and a lot of computational power. Given its computationally complexity, the training to generate and output a digital image is difficult, going beyond standard computer operations or evaluations. The disclosed systems and methods enhance the capability to train image generation models and make an image generated from a request accessible to a device, which implements a solution rooted in computer technology, and contributes to solving the complex problem of generating one or more digital images which can be used for neural network training or responding to a digital input.

Illustrative embodiments of the present disclosure are described below. In one embodiment a system may include at least one memory storing instructions and at least one processor configured to execute the instructions to perform operations for regenerating a region of an image with a machine learning model based on a text input. Generating an image may include at least one of producing, creating, making, computing, calculating, deriving, or outputting digital information (e.g., pixel information, such as one or more pixel values), which may form an image. Regenerating an image may refer to generating an image, such as making edits, alterations, or additions to an image. As referenced herein, an image may include digital images, pictures, art, and/or digital artwork. Text or text inputs may include written language, natural language, printed language, description, captions, prompts, sequence of characters, sentences, and/or words. In some embodiments, a text description may include a text input (e.g., received from an input/output device).

Disclosed embodiments may involve accessing a digital input image. As referenced herein, accessing may include at least one of retrieving, requesting, receiving, acquiring, or obtaining. For example, accessing a digital image may involve obtaining a digital image from a dataset, querying a memory, or receiving an image from an input/output device, such as from a user uploading an image. Accessing a digital image may also refer to obtaining an image which has been generated from a machine learning model. In some embodiments, the input image may have a plurality of pixel values. Pixels may refer to the smallest element of a digital image. It will be recognized that digital images may have a plurality of pixel values such that the values of the pixels define features in the image, such as intensity, color, or texture.

Some disclosed embodiments involve generating, with the machine learning model, an enhanced image. An enhanced image may refer to any image generated for an image enhancement task. Enhanced images may refer to regenerated images, edited images, or altered images, such as images edited according to an image enhancement prompt. In some embodiments, generating the enhanced image may be based on at least one of the input image, the masked region, or the text input. Generating based on at least one of the input image, the masked region, or the text input may refer to inputs to the machine learning model configured to generate the enhanced image, as described herein. In some examples, enhanced images may include images which include additional content, such as generating pixel values corresponding to new objects or features that were not present within an original image, or adding new objects or features outside of the original image to expand the original image.

In some embodiments, generation of the enhanced image includes replicating pixel values from the input image or the masked image to the enhanced image. Replicating pixel values may involve copying pixel values from the input image or the masked image to form the enhanced image. In one example, the machine learning model copies pixel values of the input image to the enhanced image. In another example, the machine learning model may be configured to copy pixel values of the masked image to the enhanced image by copying the pixel values not in the masked region (e.g., copying the pixel values surrounding the masked region).

Images, as discussed herein, may have one or more dimensions. Image dimensions may refer to the size of an image, and may be measured by number of pixels or units of length, such as millimeters or inches. Image dimensions may include height and width, as well as depth (e.g., in the example of 3D images). For example, an input image may include a certain height and width. It will be recognized that extending an image may involve increasing one or more dimensions of an image. Some disclosed embodiments may involve generating an extended image by overlapping a masked overlap region from an input image. Overlapping may include covering an area, including partly or entirely covering an area. An overlapped region may refer to any portion of an image which has been covered, such as an image covered by an image mask. A masked overlap region may refer to masked regions, as described herein, which may overlap portions of an image. For example, an image mask may overlap an image by masking part of the image while a portion of the mask extends out of the borders of the image. In some embodiments, overlapping involves masking pixel values corresponding to the masked overlap region. In some embodiments, an extended image may refer to a masked image, as described herein, that has a masked region extending outside the borders of the image. For example, an extended image may include an image which has pixel values masked in a region outside the image, thereby indicating that image content will be generated in that region. In some examples, an extended image may include a masked region with portions inside and outside the borders of the image (such as a masked region which spans regions both interior to the image borders and exterior to the image borders).

FIG. 1 illustrates an exemplary embodiment of an image editing dashboard 100. Dashboard 100 may be a graphical user interface presented on a device, such as input/output device 1118, as referenced in FIG. 11. The device may be a client device, including phones, tablets, computers, or the like. Some disclosed embodiments may involve transmitting instructions to a client device for generating a graphical user interface. A graphical user interface may involve any interface or display enabling interaction or communication with a user. For example, a graphical user interface may include a dashboard, website display, application display, or the like. In some examples, interaction with dashboard 100 may include receiving keyboard commands, mouse commands, or touch screen commands. It will be appreciated that dashboard 100 may be an exemplary aspect of the disclosed embodiments. In some examples, disclosed embodiments may not be limited to dashboard 100.

Dashboard 100 may include various user controls, such as text engine 102, upload engine 104, and toolbar 106. The user interface may be configured to enable interaction by receiving various inputs and/or providing various outputs, including interactions between one or more users, devices, and remote systems. Some disclosed embodiments involve receiving, via the graphical user interface, the text input. Receiving inputs may refer to obtaining or accessing inputs. Text engine 102 may receive text inputs, such as an input from a user entering a text prompt. Some disclosed embodiments may involve accessing a text input corresponding to an image enhancement prompt. An image enhancement prompt may refer to any prompt for generating an image or editing an image. For example, an image enhancement prompt may refer to a caption for generating an image, or a caption for an edited region of an image. Image enhancement prompts may include text commands for adding or replacing features or objects to an image, including adding features or objects within the margins of the original image (such as input image 114) as well as outside the margins of the original image. In one example, an image enhancement prompt may be "add a red car on the street." In another example, an image enhancement prompt may be "make the plate larger." In some embodiments, a text prompt entered into text engine 102 may be used as an input to a machine learning model to generate an input image corresponding to the text prompt. In some embodiments, an input image 114 may be uploaded via upload engine 104. For example, input image 114 may be an image stored on a user device memory and uploaded to dashboard 100. Dashboard 100 may include various tools for interacting with images. For example, toolbar 106 may include pointer 108, eraser 110, and panel addition 112.

It will be recognized that editing an image may involve the selection of a region, portion, or area of the image to edit. In some embodiments, pixel values in a region of the image may be replaced with different pixels to match a desired edit. In some embodiments, pixel values may be added outside of a given image, thereby expanding the margins of the original image. It will be appreciated that by using a machine learning model to assist with the generation of image segments corresponding to new pixel values added to an image, the newly generated image segment may better align with the desired editing outcome.

In some examples, it may be desired to display images on dashboard 100 and edit features of images, such as input image 114. Some examples of generating an image may involve editing regions on the image with masks. For example, masks may be used to edit or extend certain regions of input image 114. Some disclosed embodiments involve generating a masked image by removing a masked region from the input image. A masked region may refer to an area of an image that has been separated or isolated from the rest of the image. In some embodiments, regions outside of an image may be masked.

Masking an image may involve applying a filter to one or more regions of an image, including spatial filters or kernels. For example, a masked image may refer to an image which has a mask overlayed over certain portions of the image, such as a binary mask consisting of zero and non-zero pixel values.

Some disclosed embodiments may involve removing the masked region from an image by masking pixel values corresponding to the masked region. For example, removing the masked region may involve masking the pixel values in the masked region by replacing the pixel values with a mask of pixels with a value of zero. In some embodiments, the masked region may be determined on a graphical user interface. In some examples, one or more portions of the input image may be identified to be masked. For example, the masked region may be selected by a user via a user interface, such as using a mouse to outline the region to be removed. In some embodiments, the masked region may be randomly selected.

Figure 2:
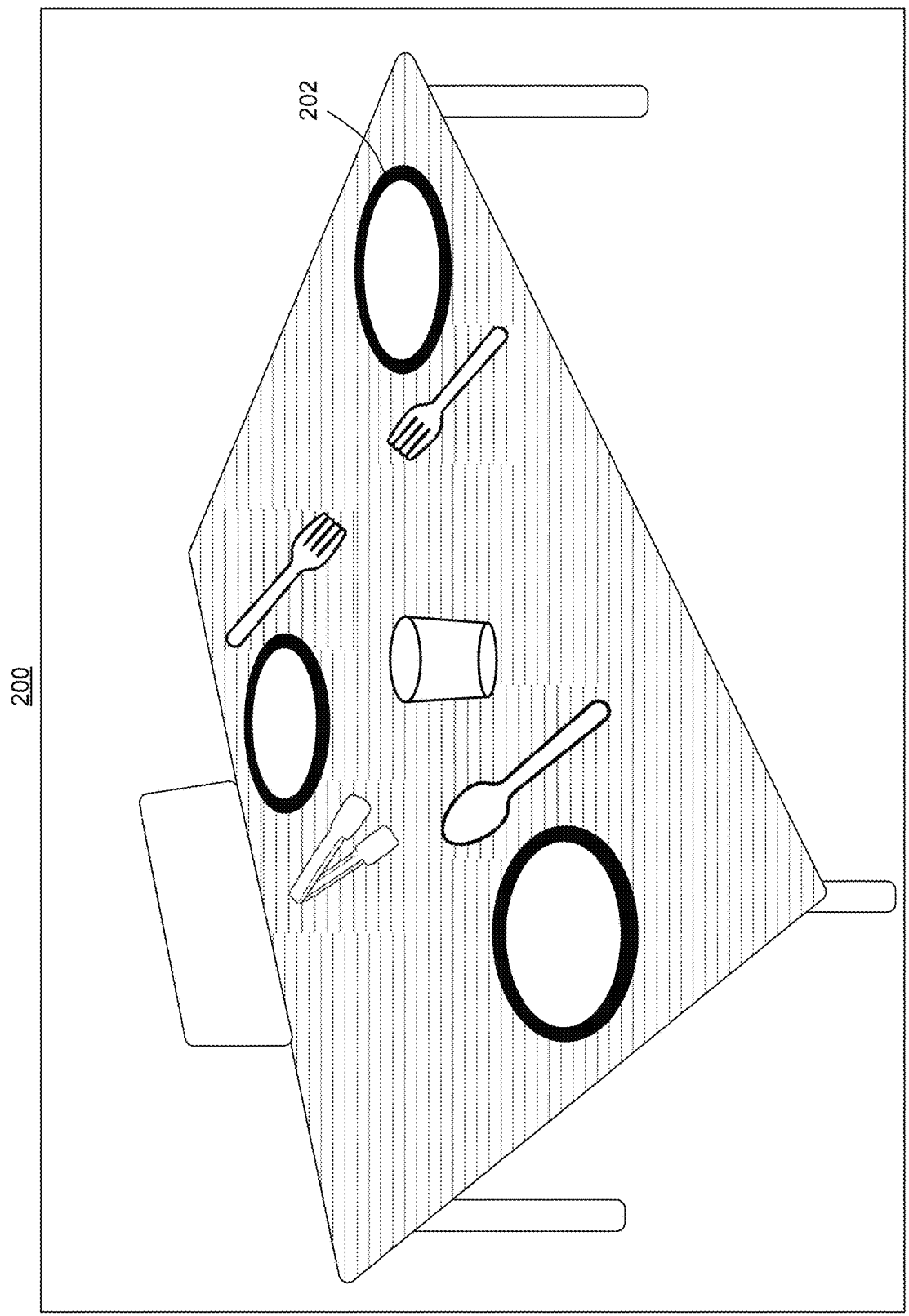
FIG. 2 is an illustration of an example input image, consistent with embodiments of the present disclosure.

FIG. 2 illustrates an example of an input image 200, consistent with embodiments of the present disclosure. FIG. 2. shows an exemplary input image 200, but input images used in the disclosed embodiments may be any digital image as described herein, including images uploaded to dashboard 100 or images generated by a machine learning model. In some embodiments, input image 200 may be a digital photograph uploaded from a user device to dashboard 100 or input image 200 may be an illustration generated by machine learning model. In some embodiments, input image 200 may include video frames or images in any suitable format such as JPEG, TIFF, RAW, PNG, SVG, GIF, or the like. It will be appreciated that input images may include a variety of styles, including realistic images, photographs, digital art, oil paintings, and the like. Input image 200 may depict a variety of objects which may be edited, altered, or changed, such as plate object 202. For example, it may be desired to remove object 202, edit various features of object 202 or replace object 202.

Figure 3:
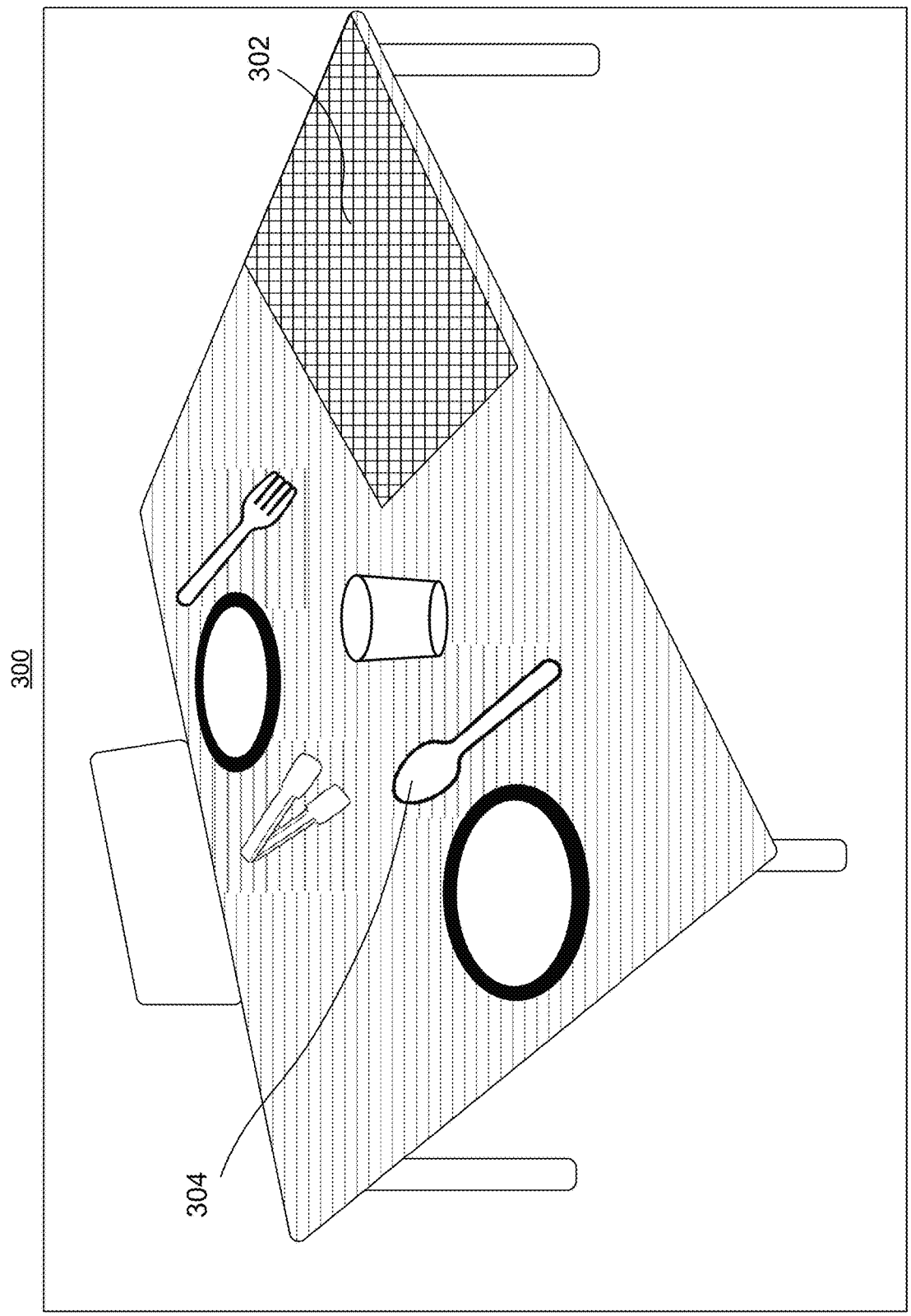
FIG. 3 is an illustration of an example masked image, consistent with embodiments of the present disclosure.

FIG. 3 illustrates an example of a masked image 300, consistent with embodiments of the present disclosure. Masked image 300 may be a version of input image 200 such that masked region 302 represents a masked portion of input image 200. For example, editing object 202 in input image 200 may involve determining the masked region 302. In some embodiments, masked region 302 may be determined by selecting or outlining the area with a tool, such as eraser 110 in dashboard 100. For example, a user may use eraser 110 to mask portions of input image 200, thereby generating the masked region 302 of masked image 300 by masking pixels within masked region 302. In some examples, generating the masked image may also mask pixels outside masked region 302, which may enable the disclosed embodiments to maintain features, styles, patterns, and context from input image 200. In some examples, masked region 302 may be determined by other suitable means, including by text-to-object recognition, such as by entering a text prompt and masking objects in the input image corresponding to the text prompt.

Figure 4:
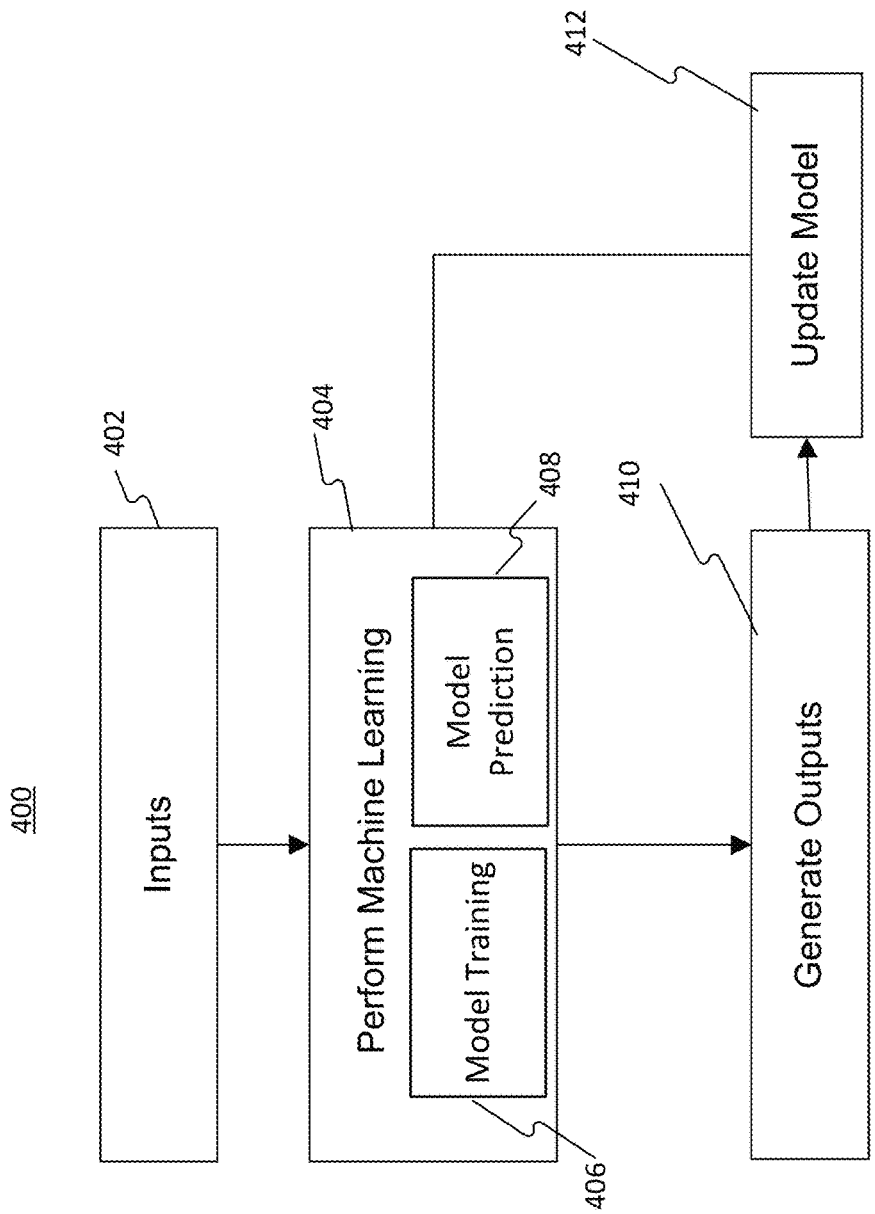
FIG. 4 is a diagram of an exemplary method for performing machine learning, consistent with embodiments of the present disclosure.

FIG. 4 illustrates an exemplary diagram describing a method 400 for training and using a machine learning model, consistent with embodiments of the present disclosure. While method 400 is described herein as being performed by a computer, method 400 may be performed by a group processors, microprocessors, FPGAs, and/or cloud computing systems.

In some embodiments, method 400 may be performed by a processor 1106 (discussed in connection with FIG. 11). Furthermore, any processors(s) used to train the machine learning model may differ or be separate from the processor(s) used to obtain the training data, the processor(s) used to generate the training dataset, or the processor(s) which may use the machine learning model for inference.

Referring to FIG. 4, method 400 may include a step 402 of providing inputs to a machine learning model. In some embodiments inputs in step 402 may include an input image, a masked region, and/or a text input to a machine learning model configured to generate an enhanced image. Some disclosed embodiments may involve providing at least two of the input image, the masked region, or the text input to the machine learning model.

Providing inputs in step 402 may include transmitting, transferring, or sending an input to a machine learning model configured to receive the input. For example, a processor may provide the input image to the machine learning model (e.g., processor may provide an input image such as image 200 which may be generated by a machine learning model or uploaded via user interface 100 to a machine learning model). Providing the input image may include transmitting pixel values corresponding to the input image, as well as any metadata such as file information. Machine learning models may learn features from input images, including styles, tones, and context contained within images.

Providing the masked region to the machine learning model in step 402 may involve transmitting pixel values corresponding to the masked region to the machine learning model. For example, some or all pixel values within the determined region may be provided to the machine learning model such that the features or objects represented by the pixels are transmitted to the model.

Providing the text input to the machine learning model in step 402 may include transmitting text inputs, such as a text input to dashboard 100, to the machine learning model. In some embodiments, the input image, the masked region, and the text input are provided to the machine learning model.

In some embodiments, providing the text input to the machine learning model may enable guidance of the image generation. For example, by providing a text input to the model, the machine learning model may be able to generate a more accurate image alteration (e.g., in an example in which a user provides a caption of a desired change to the input image 200 via interface 100, the machine learning model may generate pixel values corresponding to the text). In some embodiments, the machine learning model may be any machine learning model configured to generate an enhanced image. As a non-limiting list, machine learning models as described herein may include any combination of neural networks, convolutional neural networks, generative neural networks, generative adversarial networks, generative pre-trained transformers, autoregressive models, encoders, decoders, autoencoders, diffusion models, or the like. A machine learning model, as discussed herein, may include one or more models. For example, machine learning models may include multiple models used in a parallel manner or a series manner (e.g., the output of one machine learning model may be an input to another machine learning model), such as in the example of one or more sub-models.

In some embodiments, the machine learning model may include a deep learning model alongside a large-language model. Large-language models, which may include one or more transformers, may refer to models capable of utilizing large datasets to understand, generate, and predict content. For example, transformers may be deep learning architectures, such as neural networks, which include encoder and/or decoder networks, as well as attention mechanisms, to learn contextual relationships within data. In some embodiments, the machine learning model has a text-to-image model trained on a set of images. A text-to-image model may refer to any machine learning model configured to generate images with guidance of a text input. For example, text-to-image machine learning models may generate an output image corresponding to a text input, such as a caption or image generation prompt, as well as generate modified versions of an image based on text inputs, such as text prompts to alter or edit features within the input.

In some embodiments, the machine learning model may include a diffusion model. A diffusion model may involve a transformer-implemented generative model. A diffusion model may learn structure in data by modeling the diffusion of the data in a latent space. A latent representation space (e.g., including multiple latent representations), feature space, or embedding space, may include a mathematical space representing a mapping of what a neural network has learned from training data, such as a set of images. For example, in a latent space, data points that have similar features may be positioned closer to each other. As such, a latent space may be a compressed spatial representation. For example, a diffusion model may involve a neural network which denoises an image by reversing a diffusion process. The diffusion process may involve adding noise to an input, such as randomly sampled noise and Gaussian noise, at different steps, until the input becomes indistinguishable from noise. In some embodiments, the process of adding noise may include a Markov chain beginning with an image and resulting in an image that is an approximation of pure noise. The diffusion model may be trained to reverse the noising process and attempt to reconstruct the noisy image to its original form. For example, neural networks such as convolutional neural networks, including UNET, may predict the noise in each image step. In some embodiments, at least one process (e.g., using a decoder) may then reconstruct the noise to generate the output image. As such, the model may be trained to regenerate data (e.g., at each step) that may resemble what the original data was before each noising step. For example, in the reverse process (e.g., at each step in the reverse process), the model may generate an image or an image segment. Inputs to the diffusion model may include the masked image, the masked region (such as the pixel values and area corresponding to the masked region).

As discussed herein, some embodiments of a machine learning model may involve one or more sub-models. Some disclosed embodiments involve a first sub-model configured to generate an image embedding based on at least one of the text input, the masked image, and the masked region. An embedding, including an image embedding, may include an output of a machine learning model, such as a numeric, vector, or spatial representation of the input to the text encoder. For example, an image embedding may include a mapping of a given image input to a multidimensional vector representation, such as a lower-dimensional representation of the image. In some embodiments, the first sub-model may include a prior model alongside an image encoder that is jointly trained with the prior model. The image encoder may receive inputs of the masked image and the masked region, and the prior model may receive an input of text, such as a caption, or a text embedding. The first sub-model may generate an image embedding, such as an image embedding corresponding to the masked image. Some disclosed embodiments involve a second sub-model configured to generate the enhanced image based on at least one of the image embedding, the text input, the masked image, and the masked region. The second sub-model may include a decoder and/or a diffusion model, as described herein. For example, the second sub-model may be provided the image embedding and may generate an output, such as the enhanced image, based on the image embedding. It will be appreciated that using image embeddings for the second sub-model to create the enhanced image by replacing pixel values in the masked region provides various advantages to the generated image, including producing more realistic images. In some examples, the image embedding and the text input, such as a caption, may be provided to the second sub-model. It will be appreciated that providing the caption of the desired image enhancement prompt to the second sub-model may provide additional guidance to the second sub-model for image generation, such as in the diffusion process, thereby increasing the accuracy of the generated enhanced image. For example, a given enhancement caption may assist the model and enable the model to generate pixel values for the image segment which more accurately correspond to the caption.

As shown in FIG. 4, method 400 may include a step 404 of performing steps for model training 406 and/or model prediction 408. Model prediction 408 may involve performing inferences based on any inputs provided to the model, including inputs not used for training. Inference may refer to the using the trained machine learning model to generate predictions or outputs (e.g., an output image in the example of a text-to-image machine learning model).

Step 406 of model training may include training the model on a set of images. A set of images may include one or more images, and each image in the data set may have similar or different features to one another. As such, features in different images may belong to different classifications, or images may be associated with different classes. In some embodiments, training data sets may include a set of text descriptions (e.g., words, labels, sentences, phrases, or combinations thereof) corresponding to the set of images. Text descriptions corresponding to the set of images may include captions, subtitles, or details that may explain features of an image or represent the image in a written form. For example, a text description may include a caption which describes prominent aspects, themes, and/or characteristics in the image. In some embodiments, sets of text descriptions which correspond to a set of images may be sets of images with associated captions. For example, image-caption pairings may be stored in a database, or stored as part of datasets commonly used in the field, such as the IMAGENET dataset or other public datasets available on the internet.

In some embodiments, training the machine learning model in step 406 involves determining one or more masked regions for at least one image in the set of images. Training of the model may involve masking different regions of training images to learn features in the image which have been removed by the mask. For example, training may involve the model (or a training operator) masking pixel values in different regions of training images, either in a random or predetermined manner. It will be recognized that by masking different regions, the machine learning model may be trained to emulate how the image editing capabilities of the model can be used.

In an example of training masking different regions, eraser 110 may include a brush tool that may be used (e.g., by a user) to mask certain regions of an input image to dashboard 100. In step 406, the machine learning model may use brush tool markings to mask random regions of training images by masking the pixel values corresponding to regions determined to be erased by the model. In another example, eraser 110 may include a selection tool, such as a tool which outlines selected shapes (e.g., a user defined shape, a rectangular shape, a circular shape, or the like). In step 406, the machine learning model may use the selection tool markings or selections to mask random regions of training images. Thereby, it will be appreciated that the machine learning model may learn to complete, or fill in, the pixel values of the masked regions on the training image. For example, the model may learn to complete the missing pixel values in the masked regions based on text inputs, such as captions, associated with training images, as well as the surrounding context of the training image, such as features outside of the masked region. It will be appreciated that such aspects may improve machine learning training as the model may learn to robustly fill in the missing context for any masked region of an image, thereby improving how well the generated image corresponds to a desired image generation request.

As shown in FIG. 4, method 400 may include a step 408 of generating an output. The generated output may be an enhanced image, as described herein. Some disclosed embodiments may involve generating, with the machine learning model, an image segment based on the text input and pixel values from the masked image. An image segment may refer to a piece, component, or portion of an image, including an image configured to be integrated with another image. The image segment may refer to the masked region of an image such that the machine learning model generates an image segment which may replace the masked region. For example, based on the text input, the machine learning model may generate pixel values for an image segment corresponding to an image determined by the model. In some embodiments, image segments may include image extension or image expansion segments, which may refer to image segments which extend outside or beyond the original borders or dimensions of an image. The segmented image may be determined based on an inference prediction of the model, such as what images the machine learning model corresponds to the given text input. Thus, based on the training of the machine learning model, the model may generate accurate image segments which may match the description given in a text input.

In some embodiments, the surrounding pixels in a masked image may provide important information about features in the image, including objects, styles, context, meanings, and tones of the image. In some embodiments, the generated image segment may also be based on the pixel values from the masked image. Thus, the pixel values which have not been masked from the input image (e.g., the pixel values in the masked image), can provide context to the machine learning model to generate an image segment which matches styles, meanings, and tones in the image. Thus, it will be appreciated that disclosed embodiments enable the machine learning model to maintain key features of the image when generating the image segment.

In some embodiments, step 408 may involve inserting the image segment into an enhanced image by replacing the masked region. In such embodiments, inserting the image segment may involve filling in the masked region with the pixel values of the image segment. In some examples, inserting the image segment into the enhanced image may involve adjusting pixel values outside of the masked region. For example, pixel values in image portions surrounding the masked region may be altered, adjusted, or replaced as the image segment is inserted. It will be recognized that adjusting some pixel values surrounding the masked region may enable the machine learning model to generate a more photorealistic image. For example, pixel values outside the masked region may be adjusted to maintain styles, features, and objects in the enhanced image, such that any transition between pixels in the segmented region and the surrounding region do not disrupt overall the overall context and meaning of the image.

In some embodiments, method 400 may include a step 410 of generation of one or more outputs from the machine learning model. In some examples, step 410 may include the generation of an image segment, such as pixel values corresponding to a masked region of an image, including image regions inside and outside an image. In some examples, step 410 may include the generation of enhanced images by inserting pixel values corresponding to the image segment into the original image.

In some examples, step 410 of generating outputs may include generating multiple images, such as generating multiple versions of an enhanced image. In some embodiments, step 410 of generating outputs may include iteratively regenerating an image, such as using generated enhanced images as inputs to the machine learning model. For example, an enhanced image may be generated to adjust a feature within an image given a first text prompt, and the enhanced image may be provided again to the machine to adjust another feature within the image given a second text prompt. The first and second text prompts may be the same or different. In an example, the generated enhanced image may have additions made within an image, and an additional iteration of generating the enhanced image may include additions outside the image borders, and vice-versa. In some embodiments, multiple image enhancement tasks may be done simultaneously (e.g., parallel), or sequentially (e.g., in series). Thus, the machine learning model may be used to adjust a given input image to be consistent with one or more desired enhancement tasks, including for different regions of the image for enhancement.

In some examples, method 400 may include a step 412 of updating the model. Updating the machine learning model may involve adjusting parameters within the machine learning model, providing further training data to the machine learning model, and/or providing feedback to the machine learning model. Training the machine learning model may update the model, thereby improving the model and outputs generated by the model. In some examples, updating the machine learning model may involve providing additional training data to the machine learning model. For example, new pairs of images and corresponding captions may be provided to the machine learning model.

In some embodiments, the machine learning model can provide multiple outputs for a given input. For example, for a selected masked region and text caption, the machine learning model may generate one or more output enhanced images. The output images may include multiple versions of the enhanced image, such as different versions of the enhanced image with minor differences between the versions. As such, a user may be able to provide feedback regarding the generated enhanced images. For example, the user may indicate an approval (e.g., when the generated image includes the features the user desires) or disapproval (e.g., when the generated image is not consistent with the text prompt provided by the user) of certain versions of the enhanced images.

In an example, dashboard 100 may present different versions of the generated enhanced images, and a user may be able to select one or more of the versions, including by downloading the generated image or performing further edits on the version, thereby indicating approval. In some embodiments, such user feedback may be used to update the machine learning model and improve the training of the machine learning model, as the model may learn from the feedback to generate images which would be in accordance with user preferences.

Figure 5:
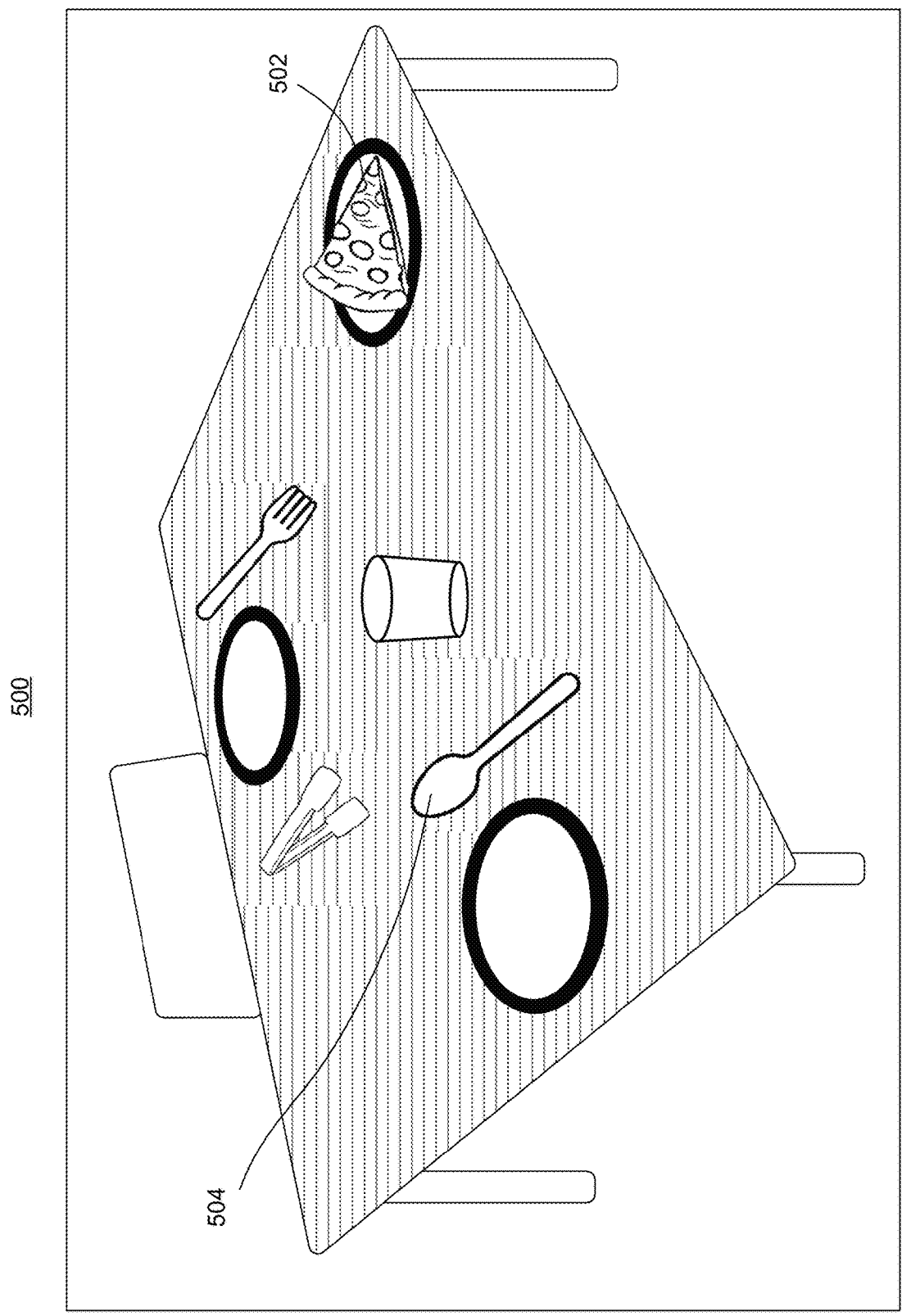
FIG. 5 is an illustration of an enhanced image, consistent with embodiments of the present disclosure.

FIG. 5 illustrates an exemplary embodiment of a generated enhanced image 500, consistent with embodiments of the present disclosure. Enhanced image 500 may represent an image generated by a machine learning model, such as a modeling engine 1030 (further discussed in connection with FIG. 10). Enhanced image 500 may include segmented image 502, which may include pixel values generated by the machine learning model and inserted into enhanced image 500. In some examples, enhanced image 500 may represent a version of masked image 300 with the masked region 302 replaced with the segmented image 502.

For example, an image enhancement prompt (e.g., a prompt entered by a user to dashboard 100) may be a caption such as "place food on the table," and the machine learning model may generate pixel values corresponding to the caption and insert the pixel values as segmented image 502. In some embodiments, features, objects, and styles outside of the masked region may be preserved in the enhanced image. For example, objects such as spoon 504 in enhanced image 500 may be maintained from the masked image 300 (as seen in corresponding spoon 304), and stylistic features such as shading 506 may also be maintained from the masked image 300.

Some disclosed embodiments involve generating an image file with the enhanced image. For example, a processor may generate an image file including the enhanced image and present the image file to memory. The image file may be any suitable image file type, as described herein. Some disclosed embodiments involve transmitting the image file via the graphical user interface. For example, enhanced images, such as enhanced image 500, may be transmitted via a graphical user interface, such as dashboard 100, which may display the enhanced image 500. In some examples, the image file type may be selectable by a user, including via dashboard 100.

In some embodiments, image enhancement may involve generating additional content for an image. Image enhancement may involve creating or adding image information to an existing image, including adding to the image beyond the original dimensions of the image. For example, image enhancement may involve adding pixel values to the outside of an image, thereby enabling the image to grow larger in one or more directions, such as growing larger in a horizontal direction, a vertical direction, or both a horizontal direction and a vertical direction. In some embodiments, image enhancement may be desired to extend an image beyond its original size for a multitude of reasons, including for artistic purposes, such as adding different styles to images, as well as purposes such as adjusting aspect ratios of images.

For example, an input image may have input image dimensions including a horizontal dimension and/or vertical dimension. The enhanced image, which may be an extended image, may have been extended in one or more of the input image dimensions, including by adding image content which extends beyond the input image dimensions. For example, the enhanced image may have a vertical dimension that may be larger than the vertical dimension of the input image, or the enhanced image may have a horizontal dimension that may be larger than the horizontal dimension of the input image. In an example, the enhanced image may have a vertical dimension that may be larger than the vertical dimension of the input image and a horizontal dimension that may be larger than the horizontal dimension of the input image. Some examples involve generating image features in the extended dimensions of the enhanced image which may match or blend with the image features inside the dimensions of the input image, such as extending an image object while maintaining styles or tones in the image.

Figure 6:
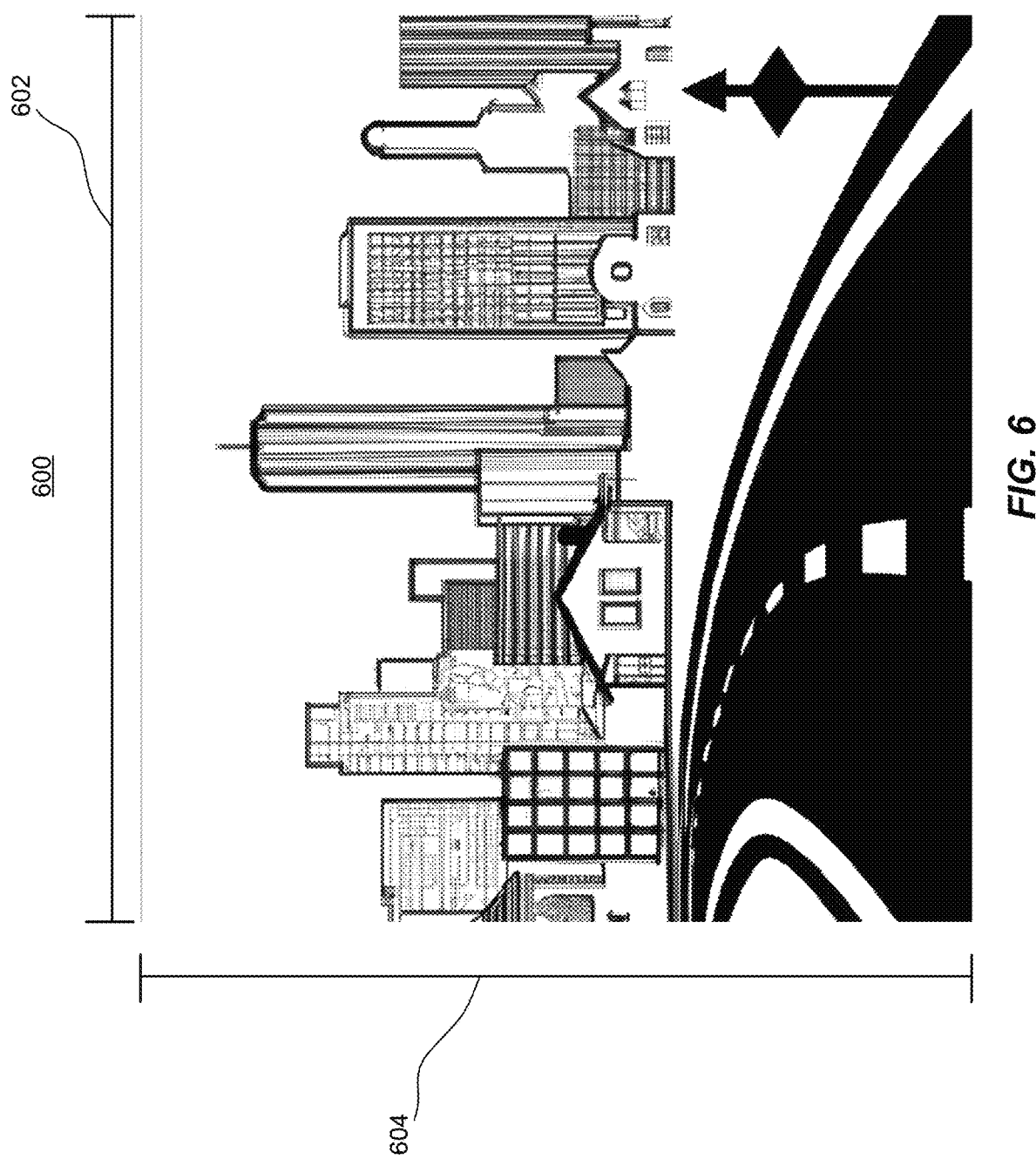
FIG. 6 is an illustration of an input image, consistent with embodiments of the present disclosure.

FIG. 6 illustrates an example of an input image 600, consistent with embodiments of the present disclosure. Input image 600 may be uploaded by a user or an image generated by a machine learning model. Input image 600 may include a first dimension 602, which may be the width of input image 600, and a second dimension 604, which may be a height of the image. In disclosed embodiments, input image 600 may be manipulated to add additional content using machine learning models. For example, input image 600 may include objects such as a city and a road, and it may be desired to add more details to the objects in the image and make the image larger.

Figure 7:
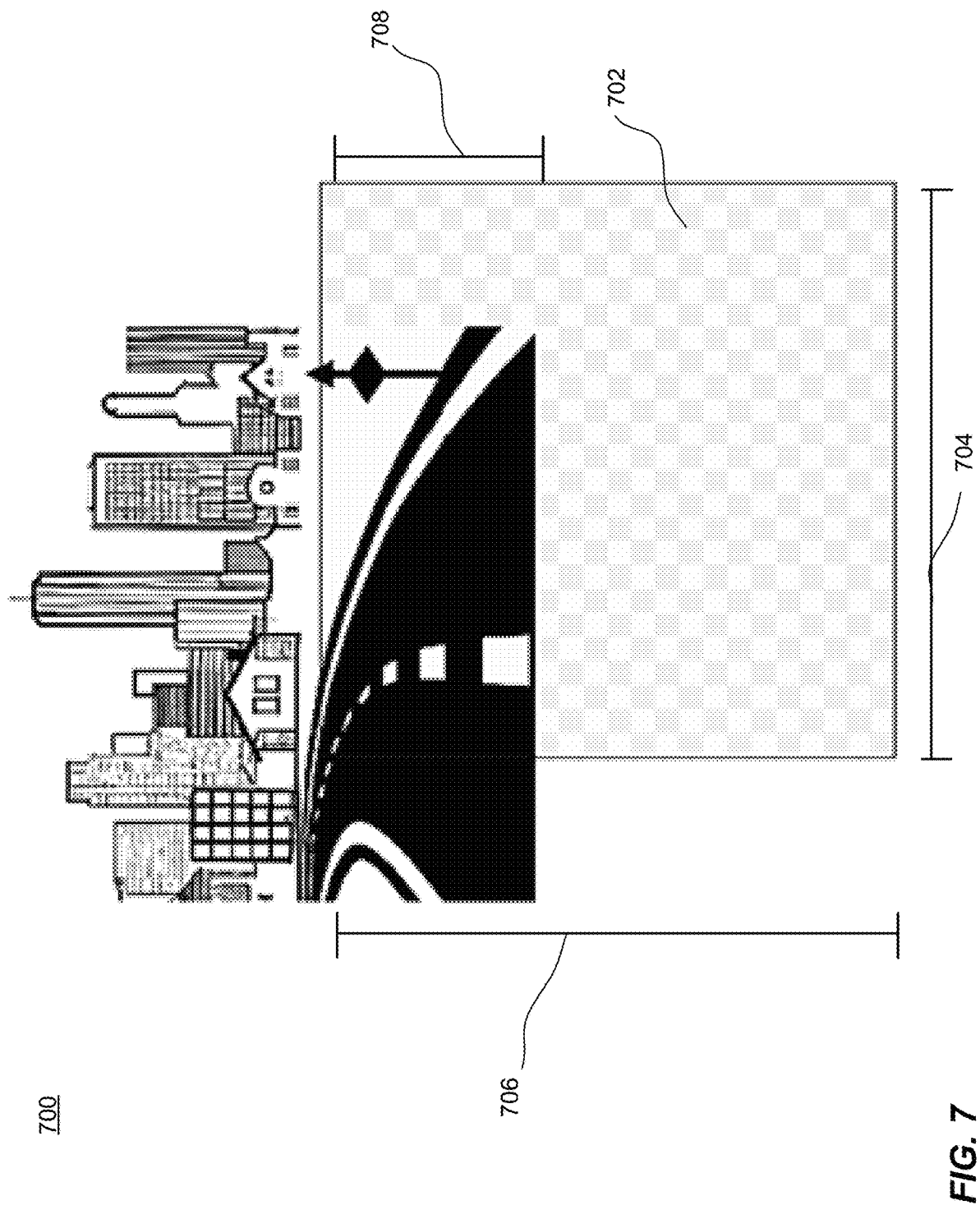
FIG. 7 is an illustration of an extended image, consistent with embodiments of the present disclosure.

FIG. 7 illustrates an example of an extended image 700, consistent with embodiments of the present disclosure. In some embodiments, a user may determine the expansion of an extended image, including determining the image content (e.g., image features, objects, and styles) generated in the expanded regions and determining the size of the expanded regions. Extended image 700 may include a masked overlap region 702 with a width dimension 704 and height dimension 706. Masked overlap region 702 may be determined by a machine learning model or by a user. For example, a user may determine the masked overlap region 702 by selecting the region, including by selecting the region via a user interface such as dashboard 100. In some examples, the masked overlap region 702 may have a predetermined size, such as a size corresponding to width dimension 704 and height dimension 706 which may be chosen by the machine learning model.

In some examples, a user may determine the size of masked overlap region 702 by choosing a width dimension 704 and a height dimension 706. It will be appreciated that the masked regions, including masked overlap regions, may include any suitable shape, including circles, ovals, rectangles, squares, trapezoids, polygons, open shapes, or the like, as well as user selected shapes. In some examples, masked overlap region 702 may be selected to include more or less overlap with extended image 700. For example, masked overlap region 702 may overlap extended image 700 by a length 708 and increasing length 708 may increase the amount of overlap while decreasing length 708 may decrease the amount of overlap. In some embodiments, increasing the amount of overlap in the masked overlap region may provide the machine learning model with more context, such as more information from the pixels in the overlap region corresponding to pixels in the input image, thereby generating an enhanced image which may be more consistent with user preferences. In some examples, multiple masked overlap regions may be selected on a given image, thereby enabling expansion of the image in multiple regions.

In some embodiments, the machine learning model may be configured to generate an enhanced image having at least one enhanced dimension. An enhanced dimension may refer to any change of a dimension, including a decrease or increase in the size of a dimension. For example, the difference between height dimension 706 and length 708 may represent an enhanced dimension which may be an increase in size between input image 600 and extended image 700. Some disclosed embodiments may involve generating, with the machine learning model, an enhanced image based on at least one of the input image, the masked overlap region, or the text input.

Some disclosed embodiments may involve generating, with the machine learning model, an image extension segment based on the text input and pixel values from the extended image. An image extension segment may refer to an image segment, as described herein. In some examples, an image extension segment may include an image segment which extends beyond the borders of an image. In some embodiments, a text input provided to the machine learning model may assist the machine learning model in generating the image segment as described herein, thereby generating an image segment which better matches the image features within the input image. In increasing the size of an image or generating content to fill an extended image, it may be desired to preserve certain image themes, semantics, styles, features, objects, and the like, as discussed herein. Thus, by training on pixel values from the input image and/or the extended image, disclosed embodiments may generate an extended image which may preserve features from the input image.

In some embodiments, inserting an image segment, such as an image extension segment, into the enhanced image may involve replacing the masked overlap region. For example, the masked overlap region may be replaced with the pixel values corresponding to the image extension segment. In some embodiments, the enhanced image may have an enhanced dimension which extends beyond a dimension in the at least one input image. Extending beyond, as described herein, may refer to extending past in length. For example, the enhanced dimension may include one or more dimensions which are greater than one or more dimensions of the input image. In some embodiments, the enhanced image has one dimension, such as a width or height, which may be larger than a width or height of the input image. In some embodiments, the enhanced dimension may have a width and height which may be larger than the width and height of the input image.

Figure 8:
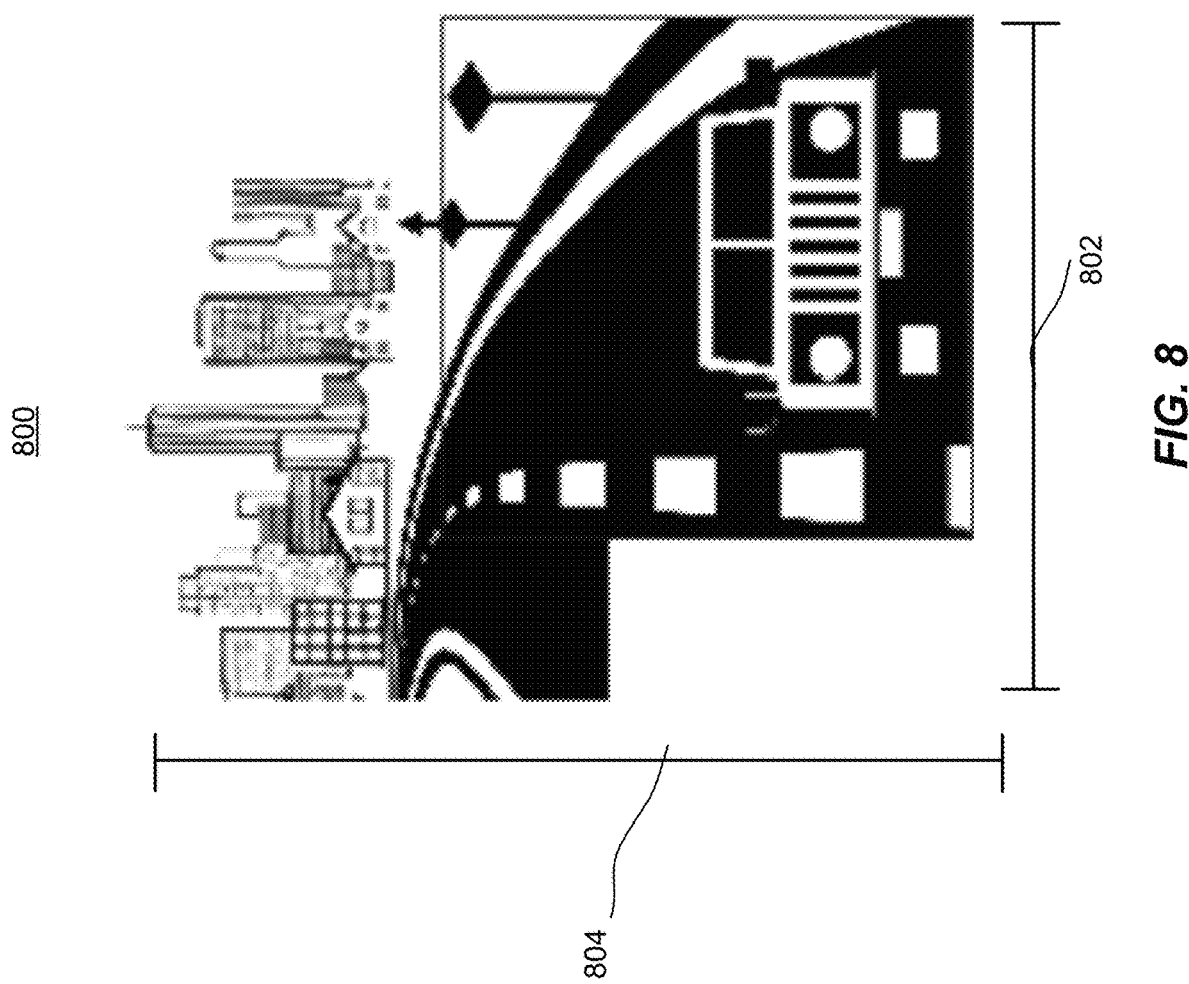
FIG. 8 is an illustration of an enhanced image, consistent with embodiments of the present disclosure.

FIG. 8 is an illustration of an exemplary enhanced image 800, consistent with embodiments of the present disclosure. It will be appreciated that, as an example, the size of enhanced image 800 may be increased from the size of input image 600. For example, enhanced image may have a width 802, larger than width 602, and height 804 larger than height 604. In some examples, such cases may refer to "outpainting" of the image. It will be appreciated that the image extension segment may represent the image regenerated for a text caption (e.g., in an example, "a car travelling on the road"). Disclosed embodiments may extend an image's border in any desired portion of the image, thereby enabling the image to expand in height, width, or both height and width. For example, the machine learning model may generate multiple enhanced images such that placing the images in a consecutive manner creates an image larger in height and/or width. In some embodiments, generating an enhanced image using machine learning models, improves the technical field of AI-based digital image generation and contributes to solving technical problems rooted in computer technology, such as expanding digital image sizes, changing digital image aspect ratios, and/or manipulating image dimensions.

In some embodiments, image enhancement may include regenerating multiple images, including editing, altering, or adding image features within the original borders of an image, as well as outside of the original borders of the image. As such, it will be appreciated that disclosed embodiments may generate new, original images, including high-quality images. It will be appreciated that the disclosed embodiments improve image-based machine learning model training, output, and accuracy, as the generated images provide new images for machine learning models to be trained on. Further, it will be appreciated that generating enhanced images based on text inputs combined together with machine learning models configured to train on images with masked regions forms a non-conventional and non-generic arrangement, which contributes to solving the technical problem of expanding an image beyond its original borders, as the machine learning models may be capable of extracting information contained in pixel values within the image to generate content outside the image, while maintaining image semantic information.

Figure 9:
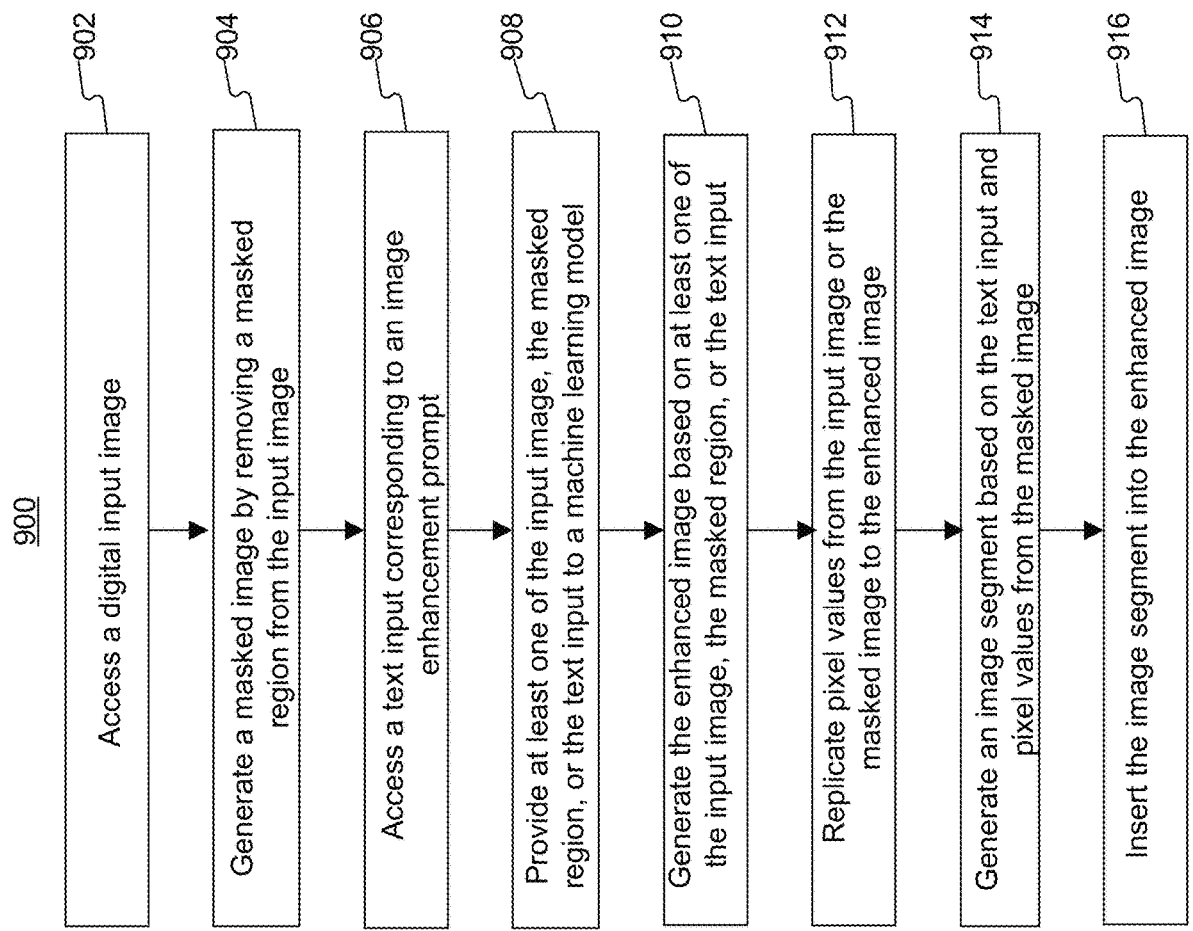
FIG. 9 is a flow diagram illustrating an exemplary method, consistent with embodiments of the present disclosure.

FIG. 9 illustrates an exemplary flow diagram of a method 900 for generating a region of an image, consistent with embodiments of the present disclosure. In some embodiments, steps and operations in method 900 may be performed by computing device 1102. In some embodiments, method 900 may be performed by processor 1106.

In some embodiments, method 900 may include a step 902 of accessing a digital input image. In some examples, the digital input image may be accessed from a user interface such dashboard 100.

In some embodiments, method 900 may include a step 904 of generating a masked image by removing a masked region from the input image. Step 904 may involve removing a masked region from the input image, such as by masking pixel values within or surrounding the masked region. In some embodiments, masked images may include extended images. For example, the masked region in the extended image may include regions inside and/or outside of the dimensions of the original image, thereby creating a region of overlap. For example, the masked region may extend outside the height and/or width of the original image. In some embodiments, method 900 may include a step 906 of accessing a text input corresponding to an image enhancement prompt. In some embodiments, the text input may correspond to an image enhancement prompt, which may include commands to edit an image or a region of an image, or the text input may correspond to an adjustment (e.g., insertions) of desired objects or features. In some examples, the text input may correspond to instructions for expanding an image, including any instructions pertaining to features or objects to be included in the expanded regions.

In some embodiments, method 900 may include a step 908 of providing at least one of the input image, the masked region, or the text input to a machine learning model. The machine learning model may be a text-to-image machine learning model, and may be trained on a set of image-caption pairs. In some examples, the machine learning model may be trained by randomly masking pixel values in regions of training images and then filling in the regions with pixel values generated by the model. In some embodiments, method 900 may include a step 910 of generating the enhanced image based on at least one of the input image, the masked region, or the text input. In some embodiments, method 900 may include a step 912 of replicating pixel values from the input image or the masked image to the to the enhanced image. For example, pixel values not corresponding to the masked region may be replicated to the input region. In some embodiments, method 900 may include a step 914 of generating, with the machine learning model, an image segment. In some embodiments, the image segment may be based on the text input and pixel values from the masked image. In some examples, the image segment may be the same size and/or shape as the masked region. For example, the image segment may include pixel values generated by the machine learning model. In some embodiments, method 900 may include a step 916 of inserting the image segment into the enhanced image. For example, step 916 may involve replacing a masked region with the image segment. For example, pixel values corresponding to the image segment may fill in or complete the masked region. In an example, the image segment may be inserted into a region within the image. In another example, the image segment may be inserted into a region outside of the image, such as a region spanning areas outside the borders of the image as well as portions within the image. In some examples, the machine learning model may be configured to generate an enhanced image having a dimension larger than one or more dimensions of the input image, thereby increasing the size of the image.

Figure 10:
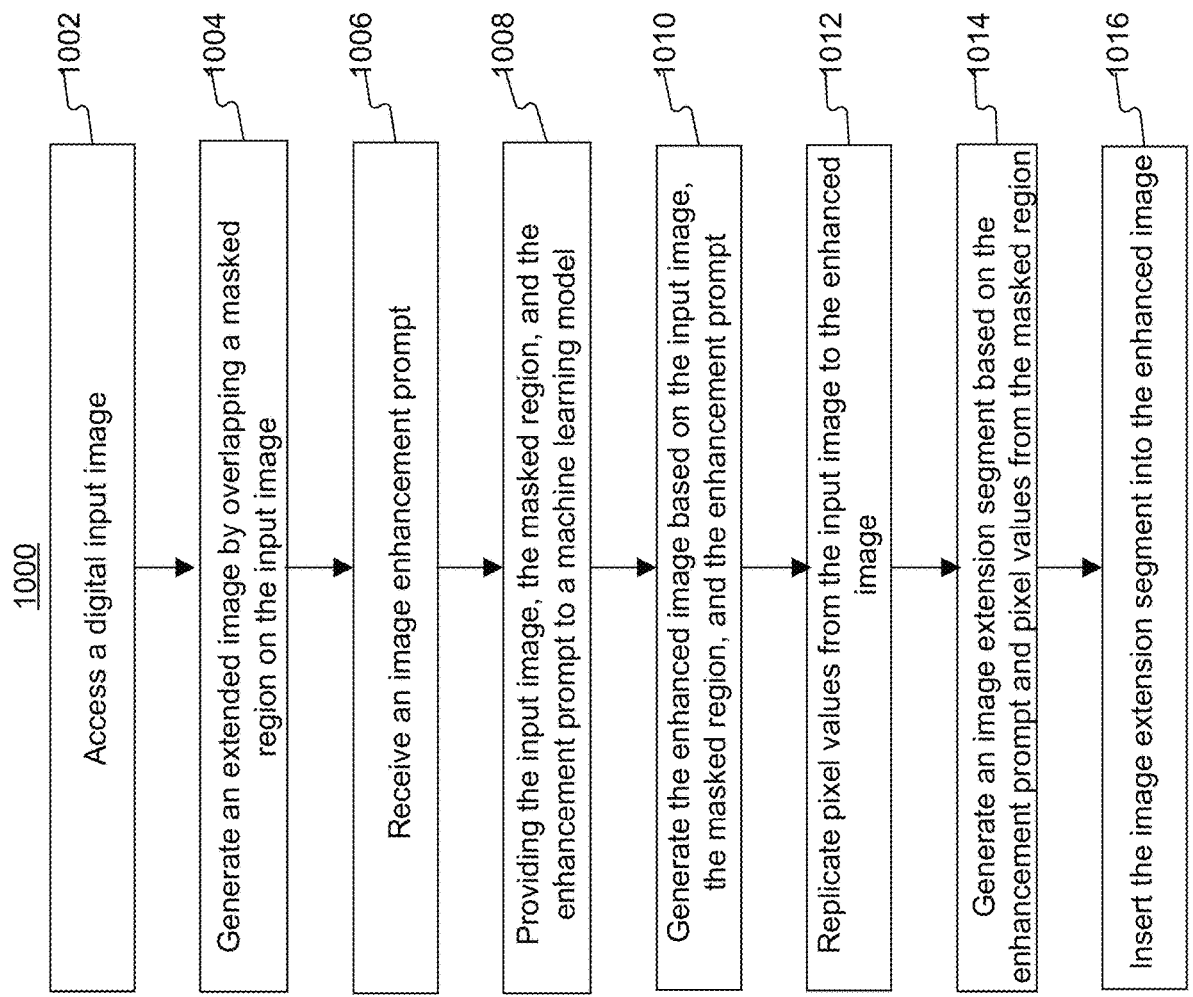
FIG. 10 is a flow diagram illustrating an exemplary method, consistent with embodiments of the present disclosure.

FIG. 10 illustrates an exemplary flow diagram of a method 1000 for generating a region of an image, consistent with embodiments of the present disclosure. In some embodiments, steps and operations in method 1000 may be performed by computing device 1102. In some embodiments, method 1000 may be performed by processor 1106.

In some embodiments, method 1000 may include a step 1002 of accessing a digital input image. For example, the digital input image may be accessed via dashboard 100. In some embodiments, method 1000 may include a step 1004 of generating an extended image by overlapping a masked region on the input image. In some examples, the overlapping comprises masking pixel values corresponding to the masked region. In some embodiments, method 1000 may include a step 1006 of receiving an image enhancement prompt. The image enhancement prompt may describe an addition to the input image. For example, the addition, such as an addition of an object or feature, may be to a region outside of the dimensions of the input image. In some embodiments, method 1000 may include a step 1008 of providing the input image, the masked region, and the enhancement prompt to a machine learning model configured to generate an enhanced image having at least one enhanced dimension. The machine learning model may include a text-to-image model trained on a set of images. In some examples, the enhanced dimension may be larger than the at least one input image dimension. Some disclosed embodiments may involve providing at least one of the input image, the masked region, or the enhancement prompt to the machine learning model.

In some embodiments, method 1000 may include a step 1010 of generating, with the machine learning model, the enhanced image based on the input image, the masked region, and the enhancement prompt. Some disclosed embodiments involve generating, with the machine learning model, the enhanced image based on at least one of the input image, the masked region, and the enhancement prompt.

In some embodiments, method 1000 may include a step 1012 of replicating pixel values from the input image to the enhanced image. For example, replicating pixel values may include copying pixel values from the input image to the enhanced image. In some examples, pixel values may be replicated from the input image and/or the extended image to the enhanced image.

In some embodiments, method 1000 may include a step 1014 of generating, with the machine learning model, an image extension segment based on the enhancement prompt and pixel values from the masked region. For example, the image extension segment may refer to a collection of pixels corresponding to an image feature, as generated by the machine learning model. In some examples, the image extension segment may be generated by the machine learning model based on at least the enhancement prompt, pixel values from the masked region, and pixel values in the extended image surrounding the masked region. For example, pixel values in the extended image surrounding the masked region may provide additional context for the image extension segment.

In some embodiments, method 1000 may include a step 1016 of inserting the image extension segment into the enhanced image by replacing the masked region with the image extension segment. For example, the pixel values corresponding to the image extension segment may be inserted into the enhanced image. In some embodiments, inserting may extend a dimension in the enhanced dimension beyond a dimension in the at least one input image dimension.

Figure 11:
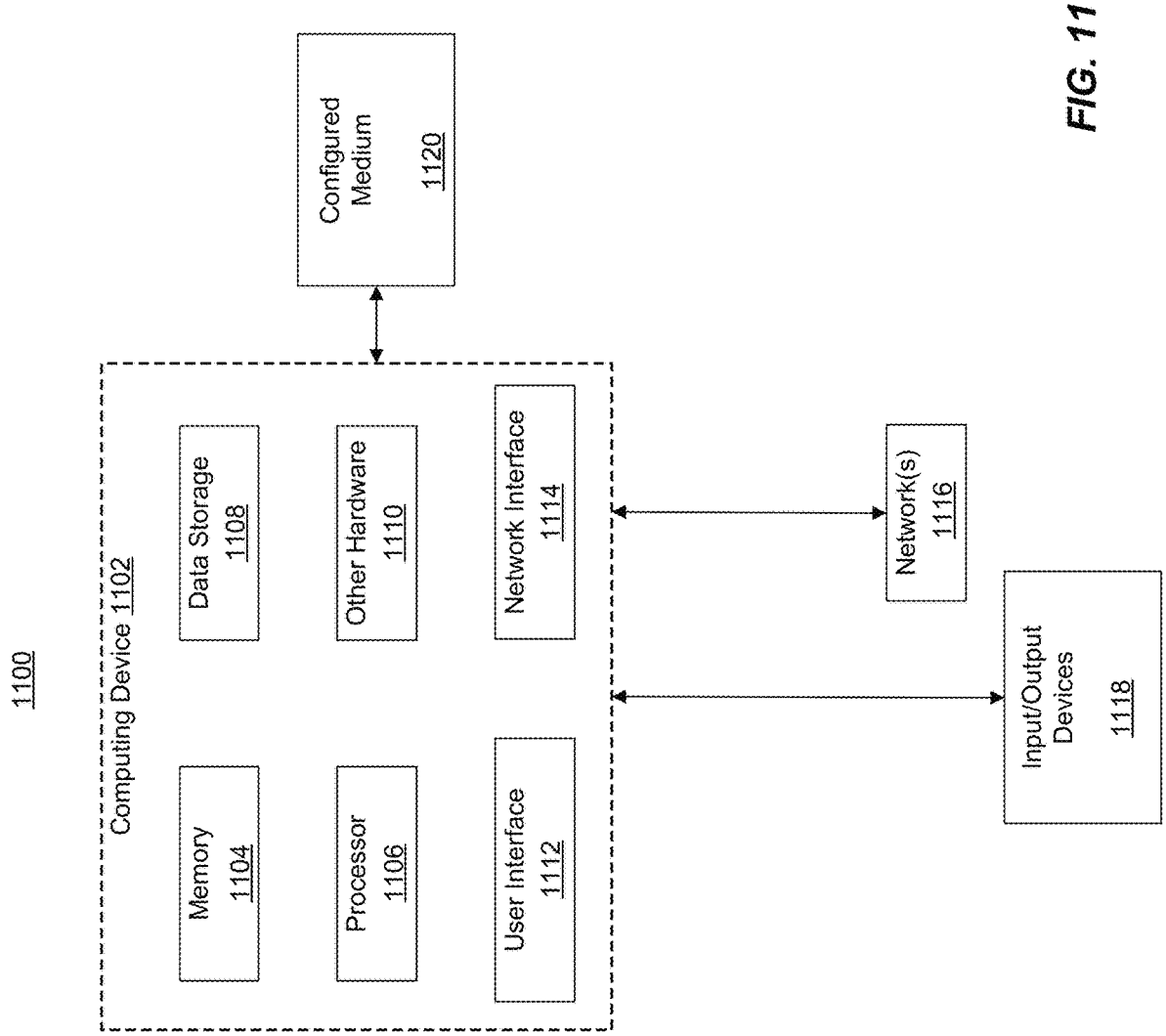
FIG. 11 is a block diagram illustrating an exemplary operating environment for implementing various aspects of this disclosure, according to some embodiments of the present disclosure.

An exemplary operating environment for implementing various aspects of this disclosure is illustrated in FIG. 11 As illustrated in FIG. 11, an exemplary operating environment 1100 may include a computing device 1102 (e.g., a general-purpose computing device) in the form of a computer. Components of the computing device 1102 may include, but are not limited to, various hardware components, such as one or more processors 1106, data storage 1108, a system memory 1104, other hardware 1110, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 11, an operating environment 1100 for an exemplary embodiment includes at least one computing device 1102. The computing device 1102 may be a uniprocessor or multiprocessor computing device. An operating environment 1100 may include one or more computing devices (e.g., multiple computing devices 1102) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 1102 may be configured for end-users, e.g., with applications, for administrators, as a server, as a distributed processing node, as a special-purpose processing device, or otherwise configured to train machine learning models and/or use machine learning models.

One or more users may interact with the computer system comprising one or more computing devices 1102 by using a display, keyboard, mouse, microphone, touchpad, camera, sensor (e.g., touch sensor) and other input/output devices 1118, via typed text, touch, voice, movement, computer vision, gestures, and/or other forms of input/output. An input/output 1118 may be removable (e.g., a connectable mouse or keyboard) or may be an integral part of the computing device 1102 (e.g., a touchscreen, a built-in microphone). A user interface 1112 may support interaction between an embodiment and one or more users. A user interface 1112 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 1118 and computing device 1102, based on input received from at user interface 1112 and/or from network(s) 1116. As used throughout, "based on" may refer to being established or founded upon a use of, changed by, influenced by, caused by, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 1102 in other embodiments, depending on their detachability from the processor(s) 1106. Other computerized devices and/or systems not shown in FIG. 11 may interact in technological ways with computing device 1102 or with another system using one or more connections to a network 1116 via a network interface 1114, which may include network interface equipment, such as a physical network interface controller (NIC) or a virtual network interface (VIF).

Computing device 1102 includes at least one logical processor 1106. The at least one logical processor 1106 may include circuitry and transistors configured to execute instructions from memory (e.g., memory 1104). For example, the at least one logical processor 1106 may include one or more central processing units (CPUs), arithmetic logic units (ALUs), Floating Point Units (FPUs), and/or Graphics Processing Units (GPUs). The computing device 1102, like other suitable devices, also includes one or more computer-readable storage media, which may include, but are not limited to, memory 1104 and data storage 1108. In some embodiments, memory 1104 and data storage 1108 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 1120 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 1102, making its content accessible for interaction with and use by processor(s) 1106. The removable configured medium 1120 is an example of a computer-readable storage medium. Some other examples of computer-readable storage media include built-in random access memory (RAM), read-only memory (ROM), hard disks, and other memory storage devices which are not readily removable by users (e.g., memory 1104).

The configured medium 1120 may be configured with instructions (e.g., binary instructions) that are executable by a processor 1106; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 1120 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 1110 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 1106, memory 1104, data storage 1108, and screens/displays, an operating environment 1000 may also include other hardware 1110, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 1118 such as human user input/output devices (screen, keyboard, mouse, tablet, microphone, speaker, motion sensor, etc.) will be present in operable communication with one or more processors 1106 and memory.

In some embodiments, the system includes multiple computing devices 1102 connected by network(s) 1116. Networking interface equipment can provide access to network(s) 1116, using components (which may be part of a network interface 1114) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 1102 may operate in a networked or cloud-computing environment using logical connections to one or more remote devices (e.g., using network(s) 1116), such as a remote computer (e.g., another computing device 1102). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 1102 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 1102 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 1108 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 1108 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 11, an operating environment 1100 may include at least one computing device 1102, the at least one computing device 1102 including at least one processor 1106, at least one memory 1104, at least one data storage 1108, and/or any other component discussed above with respect to FIG. 11.

Figure 12:
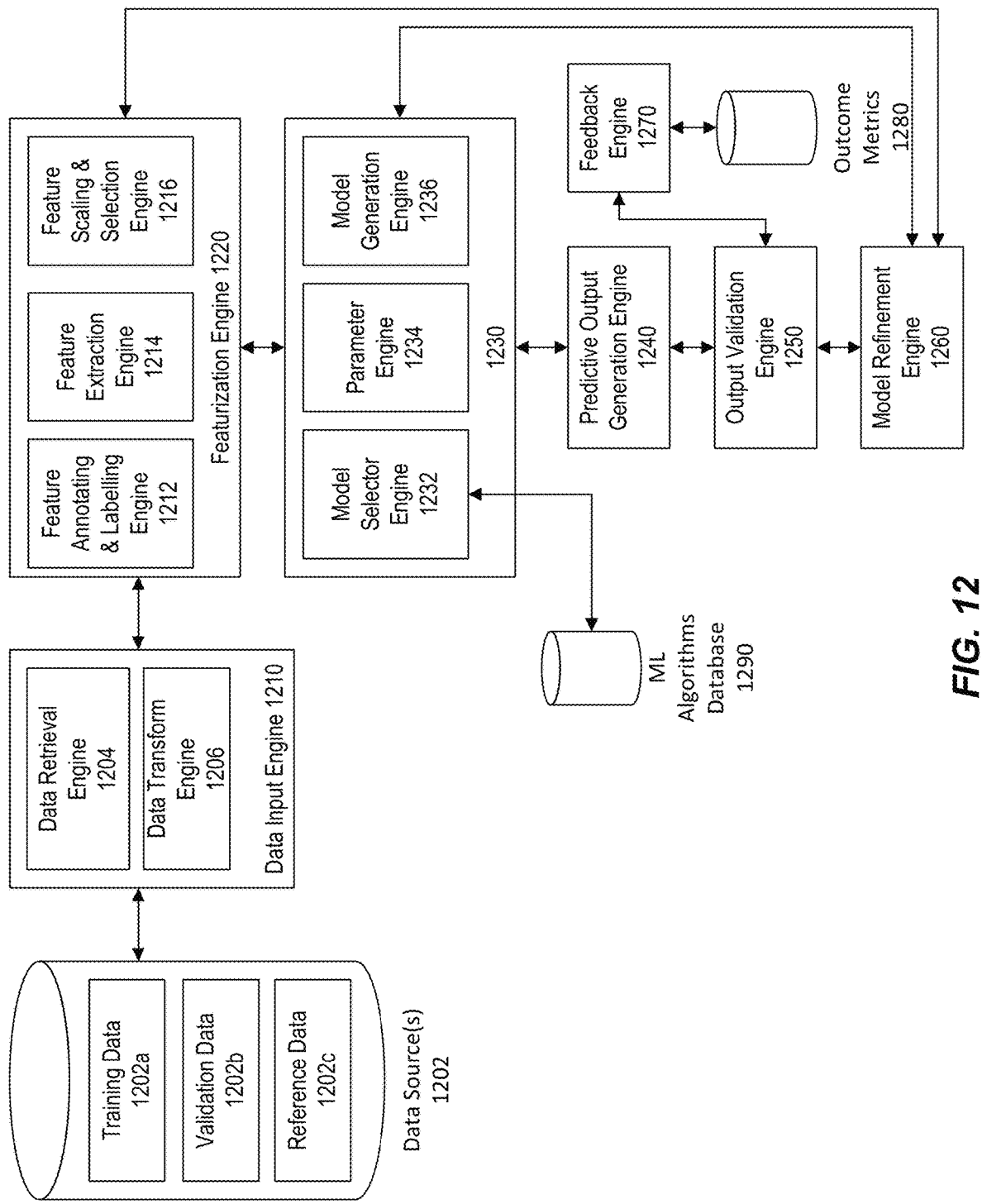
FIG. 12 is a block diagram illustrating an exemplary machine learning platform for implementing various aspects of this disclosure, according to some embodiments of the present disclosure.

FIG. 12 is a block diagram illustrating an exemplary machine learning platform for implementing various aspects of this disclosure, according to some embodiments of the present disclosure.

System 1200 may include data input engine 1210 that can further include data retrieval engine 1204 and data transform engine 1206. Data retrieval engine 1204 may be configured to access, access, interpret, request, or receive data, which may be adjusted, reformatted, or changed (e.g., to be interpretable by other engine, such as data input engine 1210). For example, data retrieval engine 1204 may request data from a remote source using an API. Data input engine 1210 may be configured to access, interpret, request, format, re-format, or receive input data from data source(s) 1202. For example, data input engine 1210 may be configured to use data transform engine 1206 to execute a re-configuration or other change to data, such as a data dimension reduction. Data source(s) 1202 may exist at one or more memories 1104 and/or data storages 1108. In some embodiments, data source(s) 1202 may be associated with a single entity (e.g., organization) or with multiple entities. Data source(s) 1202 may include one or more of training data 1202a (e.g., input data to feed a machine learning model as part of one or more training processes), validation data 1202b (e.g., data against which at least one processor may compare model output with, such as to determine model output quality), and/or reference data 1202c. In some embodiments, data input engine 1210 can be implemented using at least one computing device (e.g., computing device 1102). For example, data from data sources 1202 can be obtained through one or more I/O devices and/or network interfaces. Further, the data may be stored (e.g., during execution of one or more operations) in a suitable storage or system memory. Data input engine 1210 may also be configured to interact with data storage 1108, which may be implemented on a computing device that stores data in storage or system memory. System 1200 may include featurization engine 1220. Featurization engine 1220 may include feature annotating & labeling engine 1212 (e.g., configured to annotate or label features from a model or data, which may be extracted by feature extraction engine 1214), feature extraction engine 1214 (e.g., configured to extract one or more features from a model or data), and/or feature scaling and selection engine 1216. Feature scaling and selection engine 1216 may be configured to determine, select, limit, constrain, concatenate, or define features (e.g., AI features) for use with AI models. System 1200 may also include machine learning (ML) modeling engine 1230, which may be configured to execute one or more operations on a machine learning model (e.g., model training, model re-configuration, model validation, model testing), such as those described in the processes described herein. For example ML modeling engine 1230 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 1202a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 1230 may include model selector engine 1232 (e.g., configured to select a model from among a plurality of models, such as based on input data), parameter selector engine 1234 (e.g., configured to add, remove, and/or change one or more parameters of a model), and/or model generation engine 1236 (e.g., configured to generate one or more machine learning models, such as according to model input data, model output data, comparison data, and/or validation data). Similar to data input engine 1210, featurization engine 1220 can be implemented on a computing device. In some embodiments, model selector engine 1232 may be configured to receive input and/or transmit output to ML algorithms database 1290 (e.g., a data storage 1108). Similarly, featurization engine 1220 can utilize storage or system memory for storing data and can utilize one or more I/O devices or network interfaces for transmitting or receiving data. ML algorithms database 1290 (or other data storage 1108) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 1200 can further include predictive output generation engine 1240, output validation engine 1250 (e.g., configured to apply validation data to machine learning model output), feedback engine 1270 (e.g., configured to apply feedback from a user and/or machine to a model), and model refinement engine 1260 (e.g., configured to update or re-configure a model). In some embodiments, feedback engine 1270 may receive input and/or transmit output (e.g., output from a trained, partially trained, or untrained model) to outcome metrics database 1280. Outcome metrics database 1280 may be configured to store output from one or more models, and may also be configured to associate output with one or more models. In some embodiments, outcome metrics database 1280, or other device (e.g., model refinement engine 1260 or feedback engine 1270) may be configured to correlate output, detect trends in output data, and/or infer a change to input or model parameters to cause a particular model output or type of model output. In some embodiments, model refinement engine 1260 may receive output from predictive output generation engine 1240 or output validation engine 1250. In some embodiments, model refinement engine 1260 may transmit the received output to featurization engine 1220 or ML modelling engine 1230 in one or more iterative cycles.

Any or each engine of system 1200 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 1200 may be split across multiple computing devices to allow for distributed processing of the data, which may improve output speed and reduce computational load on individual devices. In some embodiments, system 1200 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 1200 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system comprising:
   at least one memory storing instructions;
   at least one processor configured to execute the instructions to perform operations for regenerating a region of an image with a machine learning model based on a text input, the operations comprising:
   accessing a digital input image, the input image having a plurality of pixel values;
   generating a masked image by removing a masked region from the input image, wherein the removing comprises masking pixel values corresponding to the masked region;
   accessing a text input corresponding to an image enhancement prompt;
   providing at least one of the input image, the masked region, or the text input to a machine learning model configured to generate an enhanced image, wherein the machine learning model comprises a text-to-image model trained on a set of images; and
   generating, with the machine learning model, the enhanced image based on at least one of the input image, the masked region, or the text input; wherein the generation of the enhanced image comprises:
   replicating pixel values from the input image or the masked image to the enhanced image;
   generating, with the machine learning model, an image segment based on at least one of the text input or the pixel values from the masked image; and
   inserting the image segment into the enhanced image by replacing the masked region.

2. The system of claim 1, wherein the providing comprises providing at least two of the input image, the masked region, or the text input to the machine learning model.

3. The system of claim 2, wherein the providing comprises providing the input image, the masked region, and the text input to the machine learning model.

4. The system of claim 1, further comprising:
   transmitting instructions to a client device for generating a graphical user interface; and
   receiving, via the graphical user interface, the text input.

5. The system of claim 4, wherein the masked region is determined on the graphical user interface.

6. The system of claim 5, wherein a user provides, via the graphical user interface, at least one of the determined masked region or the text input.

7. The system of claim 4, wherein generating the enhanced image comprises:
   generating an image file with the enhanced image; and
   transmitting the image file via the graphical user interface.

8. The system of claim 1, further comprising training the machine learning model by determining one or more masked regions for at least one image in the set of images.

9. The system of claim 1, wherein the machine learning model comprises a deep learning model alongside a large language model.

10. The system of claim 1, wherein the machine learning model further comprises:
    a first sub-model configured to generate an image embedding based on at least one of the text input, the masked image, and the masked region; and
    a second sub-model configured to generate the enhanced image based on at least one of the image embedding, the text input, the masked image, and the masked region.

11. A method for regenerating a region of an image with a machine learning model based on a text input, the method comprising:
    accessing a digital input image, the input image having a plurality of pixel values;
    generating a masked image by removing a masked region from the input image, wherein the removing comprises masking pixel values corresponding to the masked region;
    accessing a text input corresponding to an image enhancement prompt;
    providing at least one of the input image, the masked region, or the text input to a machine learning model configured to generate an enhanced image, wherein the machine learning model comprises a text-to-image model trained on a set of images; and
    generating, with the machine learning model, the enhanced image based on at least one of the input image, the masked region, or the text input; wherein the generation of the enhanced image comprises:
    replicating pixel values from the input image or the masked image to the enhanced image;
    generating, with the machine learning model, an image segment based on at least one of the text input or the pixel values from the masked image; and inserting the image segment into the enhanced image by replacing the masked region.

12. The method of claim 11, wherein the providing comprises providing at least two of the input image, the masked region, or the text input to the machine learning model.

13. The method of claim 12, wherein the providing comprises providing the input image, the masked region, and the text input to the machine learning model.

14. The method of claim 11, further comprising:
   transmitting instructions to a client device for generating a graphical user interface; and
   receiving, via the graphical user interface, the text input.

15. The method of claim 14, wherein the masked region is determined on the graphical user interface.

16. The method of claim 15, wherein a user provides, via the graphical user interface, at least one of the determined masked region or the text input.

17. The method of claim 14, wherein generating the enhanced image comprises:
   generating an image file with the enhanced image; and
   transmitting the image file via the graphical user interface.

18. The method of claim 11, further comprising training the machine learning model by determining one or more masked regions for at least one image in the set of images.

19. The method of claim 11, wherein the machine learning model comprises a deep learning model alongside a large language model.

20. The method of claim 11, wherein the machine learning model further comprises:
   a first sub-model configured to generate an image embedding based on at least one of the text input, the masked image, and the masked region; and
   a second sub-model configured to generate the enhanced image based on at least one of the image embedding, the text input, the masked image, and the masked region.

* * * * *